US011650417B2

(12) United States Patent
Williams et al.

(10) Patent No.: US 11,650,417 B2
(45) Date of Patent: May 16, 2023

(54) VIDEO PROCESSING

(71) Applicant: Sony Interactive Entertainment Inc., Tokyo (JP)

(72) Inventors: Nigel John Williams, London (GB); Patrick John Connor, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 19 days.

(21) Appl. No.: 17/381,466

(22) Filed: Jul. 21, 2021

(65) Prior Publication Data

US 2022/0035155 A1 Feb. 3, 2022

(30) Foreign Application Priority Data

Jul. 29, 2020 (GB) ..................................... 2011749

(51) Int. Cl.
*G02B 27/00* (2006.01)
*G02B 27/01* (2006.01)
*G06F 3/01* (2006.01)

(52) U.S. Cl.
CPC ....... *G02B 27/0093* (2013.01); *G02B 27/017* (2013.01); *G06F 3/013* (2013.01);
(Continued)

(58) Field of Classification Search
CPC . G06F 3/011; G06F 3/013; G09G 2320/0257; G09G 2320/0261;
(Continued)

(56) References Cited

U.S. PATENT DOCUMENTS

2002/0196224 A1* 12/2002 Ham .................... G09G 3/3648
345/94
2007/0291033 A1 12/2007 Phelps
(Continued)

FOREIGN PATENT DOCUMENTS

JP 2007226147 A 9/2007

OTHER PUBLICATIONS

Combined Search and Examination Report for corresponding GB Application No. 2011749.5, 8 pages, dated Jan. 21, 2021.
(Continued)

*Primary Examiner* — Dmitriy Bolotin
(74) *Attorney, Agent, or Firm* — Matthew B. Dernier, Esq.

(57) ABSTRACT

Apparatus comprises an image processor configured to provide output video images to a head mountable display, HMD, having one or more display elements to display video images to a wearer of the HMD, for display by the one or more display elements in response to input video images, in which each output video image corresponds to a respective input video image; in which: the image processor comprises a detector configured to detect whether an input image brightness at image locations in the input video images exceeds a threshold image brightness; and the image processor is configured to vary a relationship between the display properties at a given image location in a given output video image and the input image display properties at the given image location in the corresponding input video image in response to a detection that image brightness at the given image location in one or more input video images preceding that corresponding input video image exceeded the threshold image brightness.

16 Claims, 14 Drawing Sheets

(52) U.S. Cl.
CPC .............. *G02B 2027/014* (2013.01); *G02B 2027/0112* (2013.01); *G02B 2027/0118* (2013.01); *G02B 2027/0138* (2013.01)

(58) Field of Classification Search
CPC .. G09G 2340/16; G09G 2360/16; G09G 5/10; G02B 2027/0112; G02B 2027/0118; G02B 2027/0134; G02B 2027/0138; G02B 2027/014; G02B 2027/0187; G02B 27/0093; G02B 27/0101; G02B 27/017; G02B 27/0172
See application file for complete search history.

(56) References Cited

U.S. PATENT DOCUMENTS

| | | | | |
|---|---|---|---|---|
| 2010/0141806 | A1* | 6/2010 | Uemura | G06T 5/50 |
| | | | | 348/241 |
| 2018/0054611 | A1* | 2/2018 | Shin | H04N 13/359 |
| 2020/0082791 | A1* | 3/2020 | Petrie | G02B 27/017 |
| 2020/0160812 | A1* | 5/2020 | Tovchigrechko | G09G 3/003 |
| 2021/0373325 | A1* | 12/2021 | Petersen | G02B 27/0093 |
| 2022/0101613 | A1* | 3/2022 | Rockel | G06T 19/006 |

OTHER PUBLICATIONS

Eye tracking—Wikipedia, https://en.wikipedia.org/wiki/Eye_tracking#Optical_tracking, 17 pages, dated May 19, 2020.
Video-oculography—Wikipedia, https://en.wikipedia.org/wiki/Video-oculography, 2 pages, dated Apr. 12, 2020.

\* cited by examiner

Positive after image and saturation – time based

Negative after image – time based

Threshold Variation

VIDEO PROCESSING

This disclosure relates to video processing.

When images are displayed to a user wearing a head mountable display (HMD), it is desirable to make the user's experience as realistic as possible and to aim to reduce the disparity between how a human visually perceives the physical world and how things are rendered in mixed realities to maximize the capabilities of the visual acuity of the user (and the photoreception of light).

However, some aspects of the human physiological and psychovisual response to viewed images do not lend themselves to being triggered by images displayed by an HMD.

It is in this context that the present disclosure arises.

Various aspects and features of the present disclosure are defined in the appended claims and within the text of the accompanying description.

Figure 1:
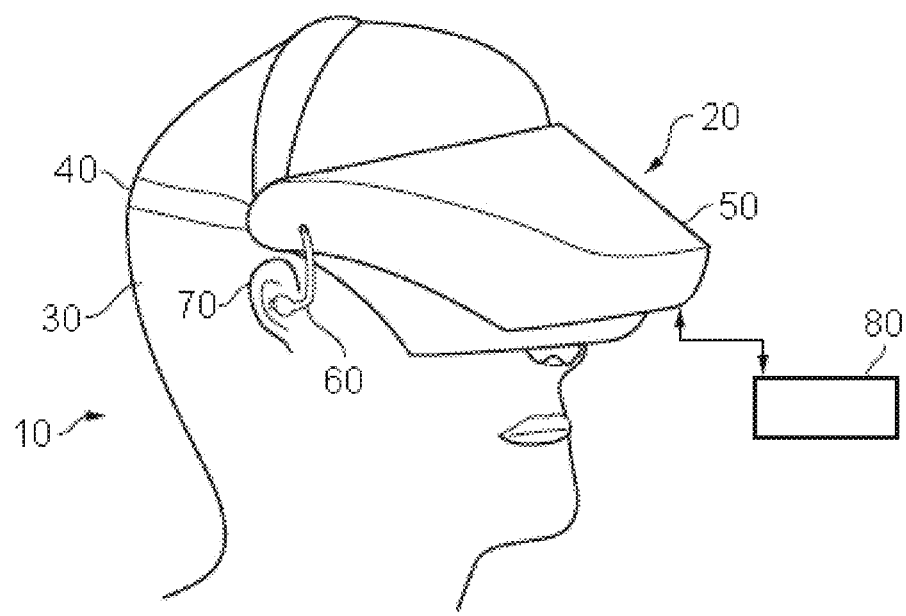
Figure 2:
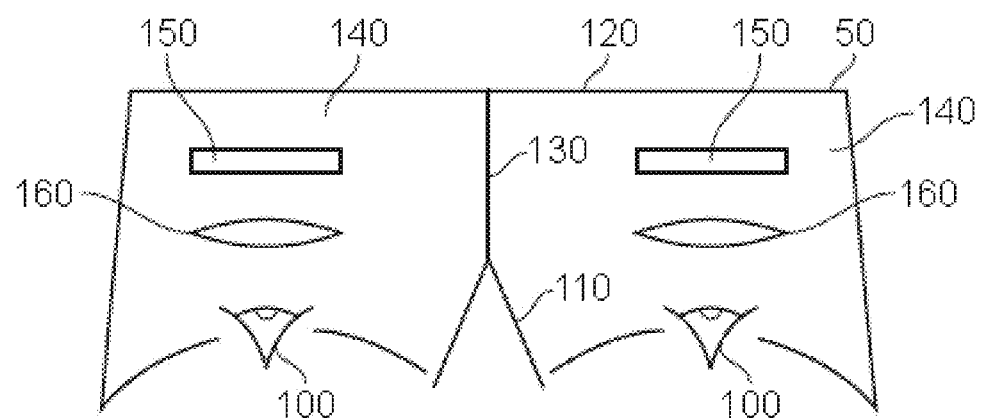
Figure 3:
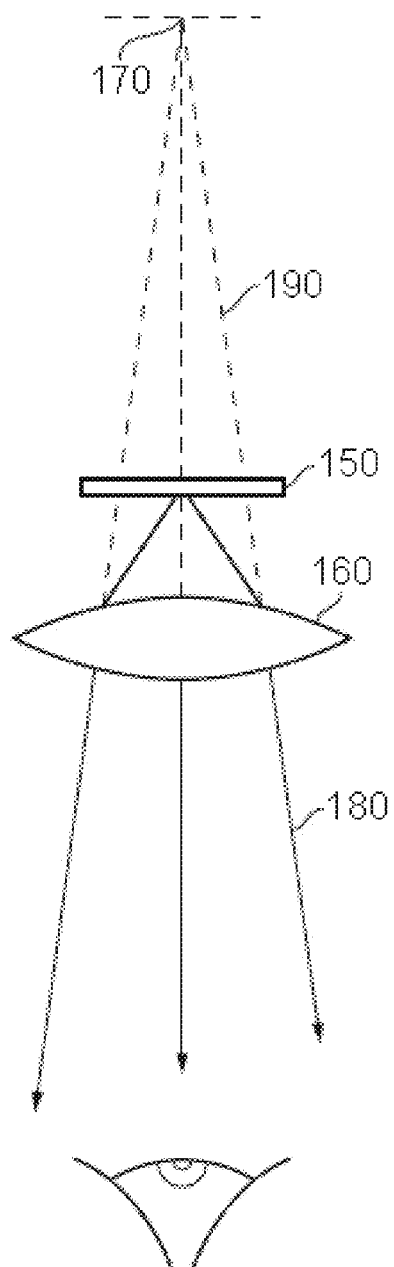
Figure 4:
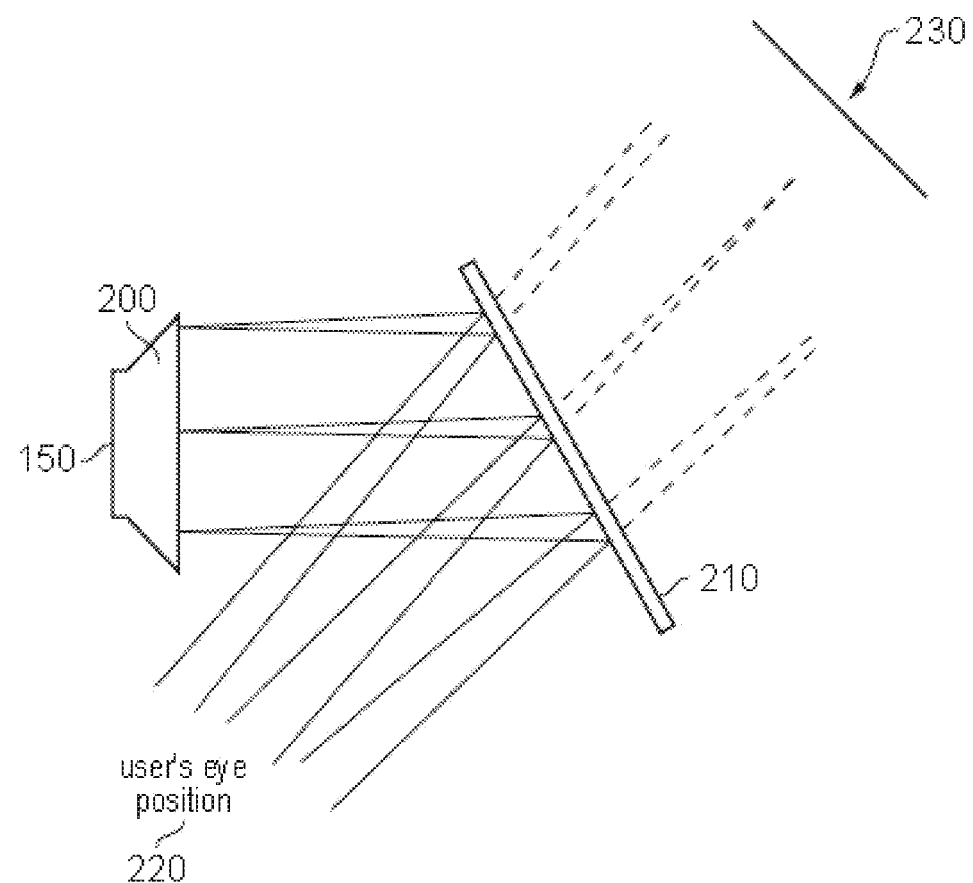
Figure 5:
Figure 6A:
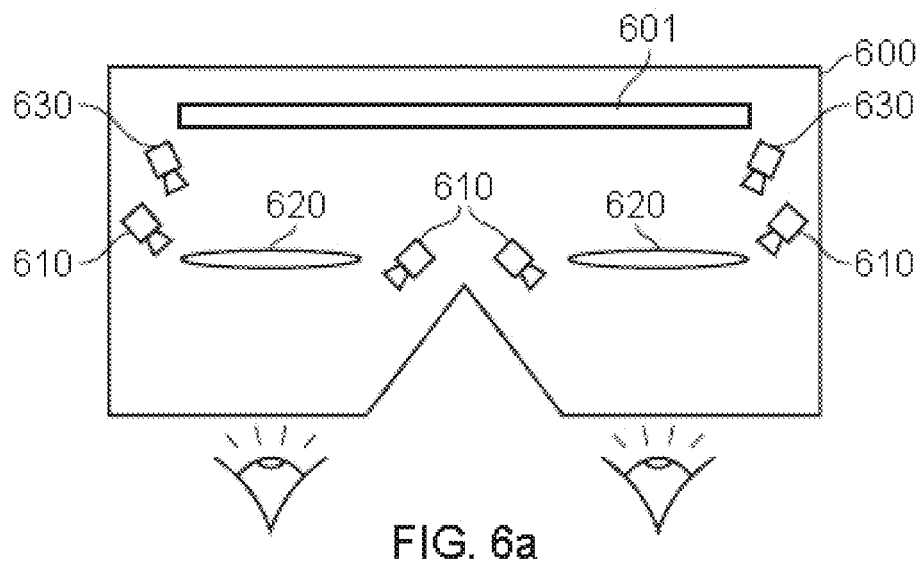
Figure 6B:
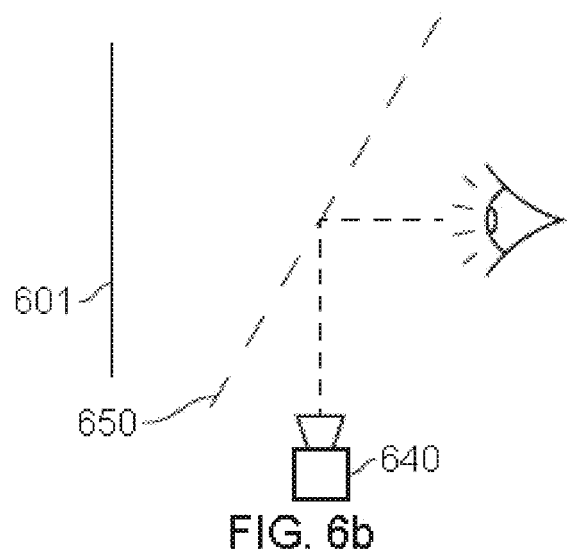
Figure 7:
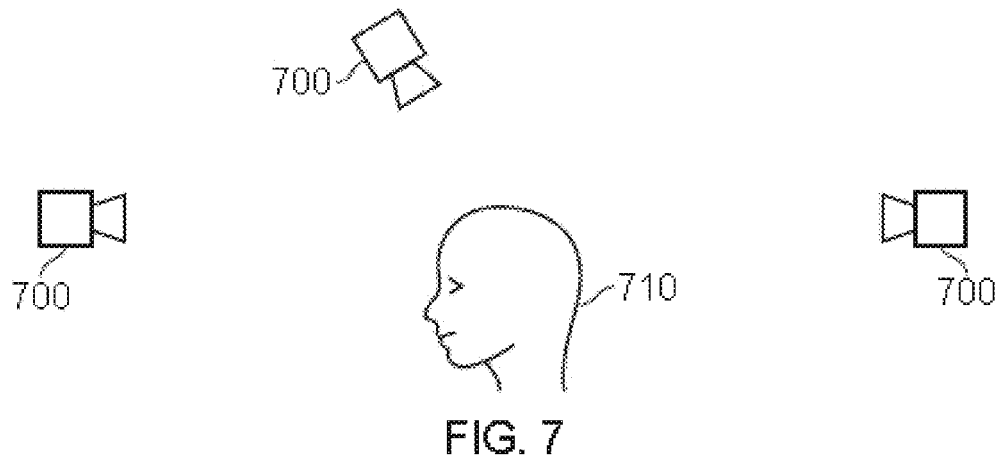
Figure 8:
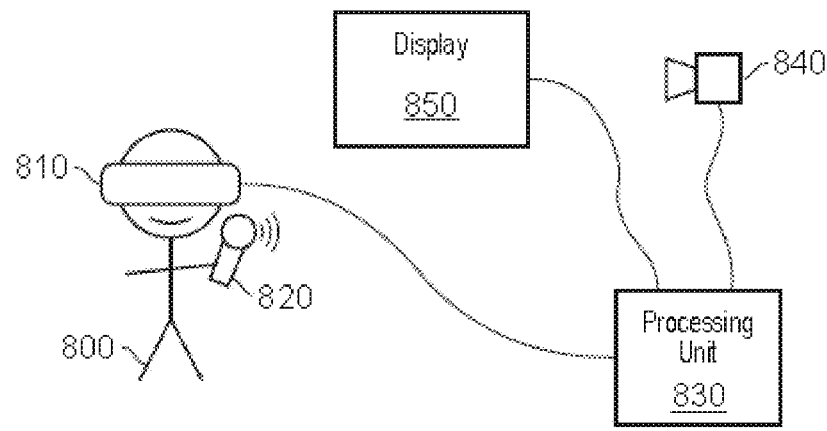
Figure 9:
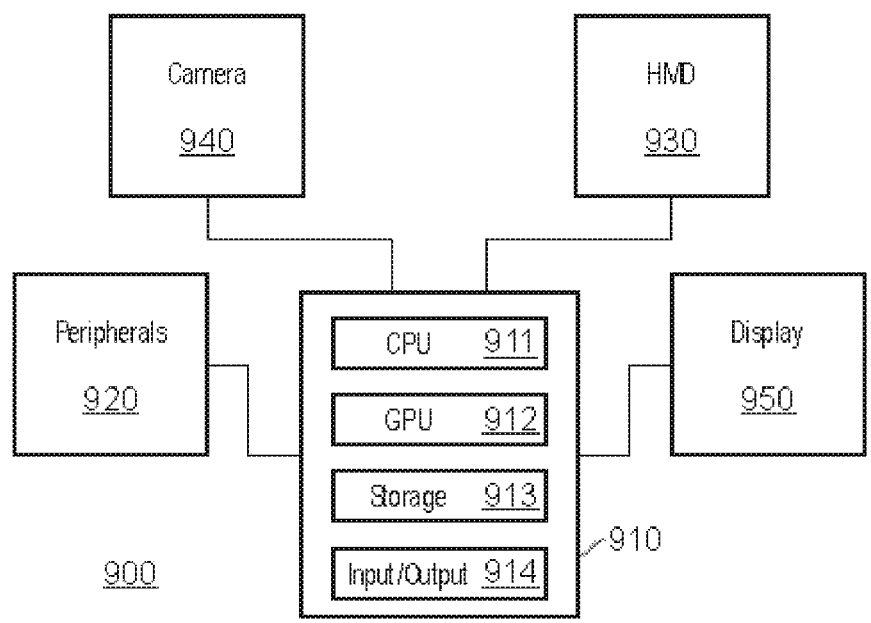
Figure 10:
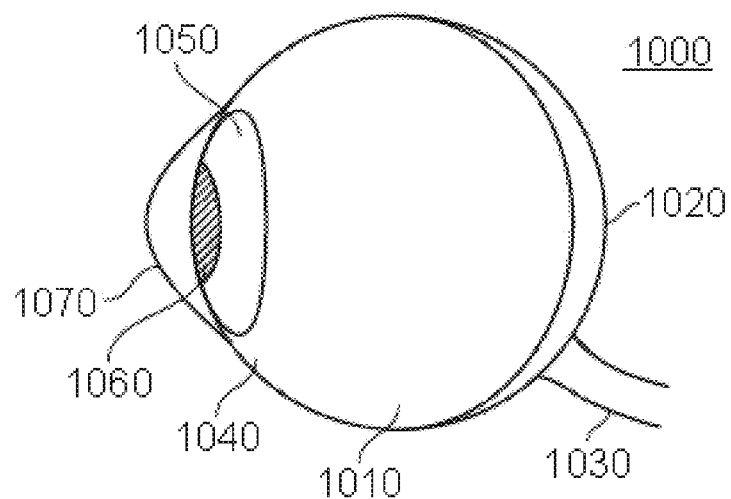
Figure 11:
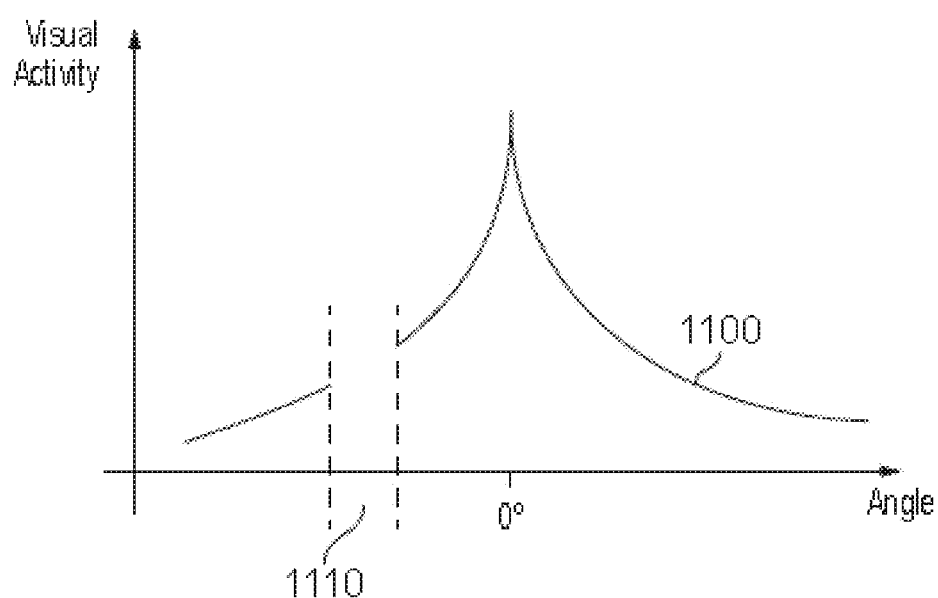
Figure 12:
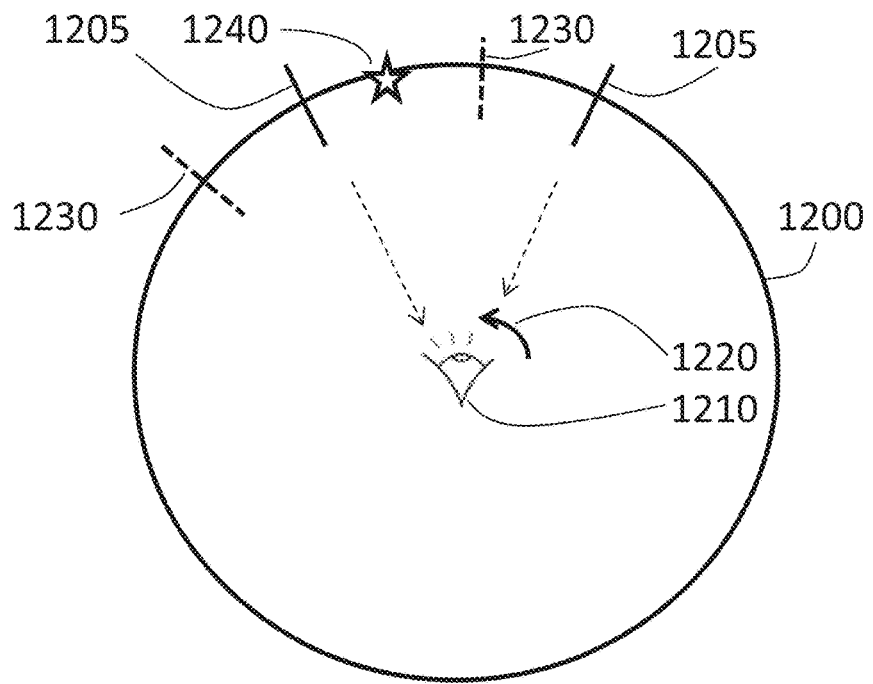
Figure 13:
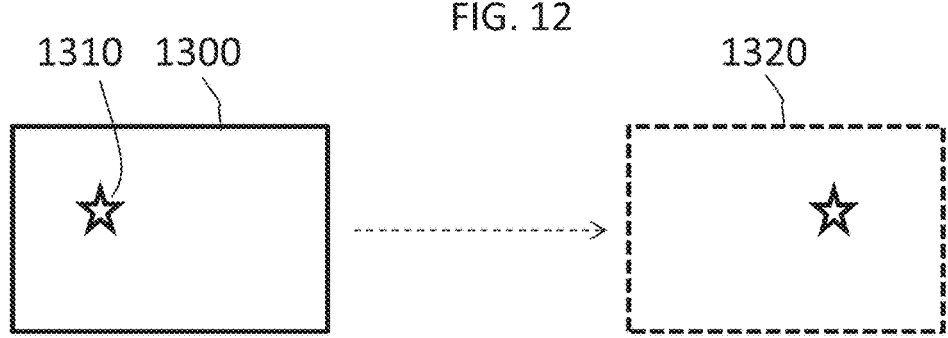
Figure 14:
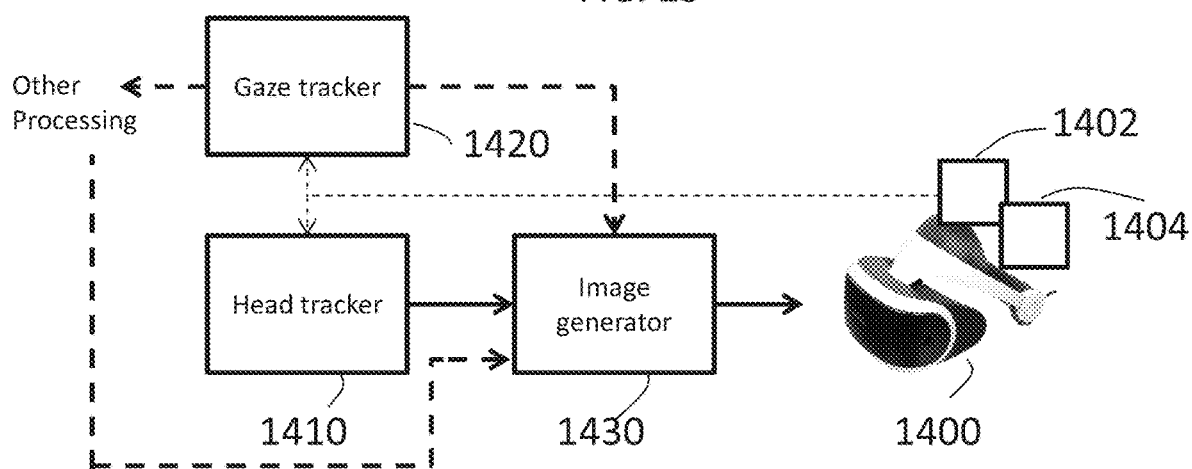
Figure 15:
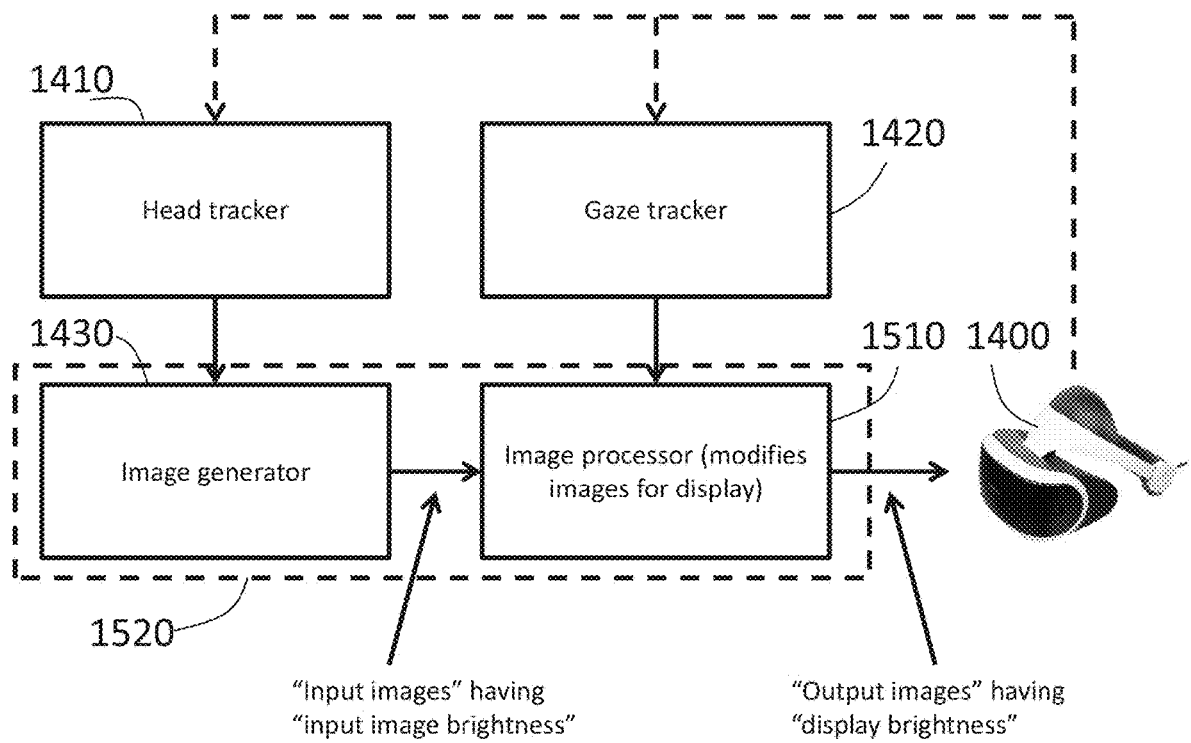
Figure 16A:
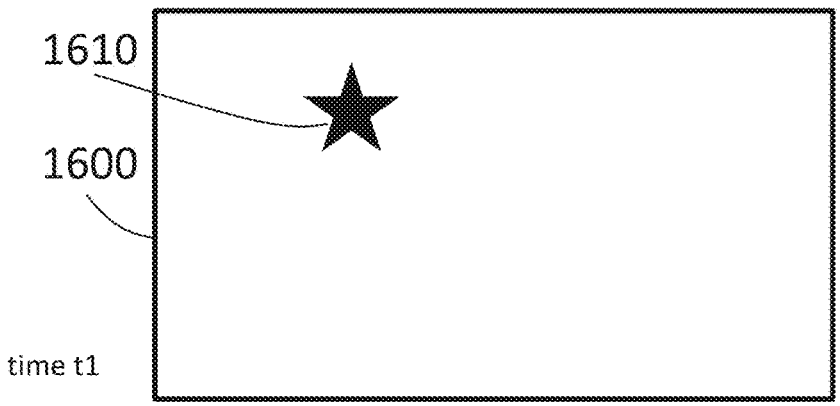
Figure 16B:
Figure 17:
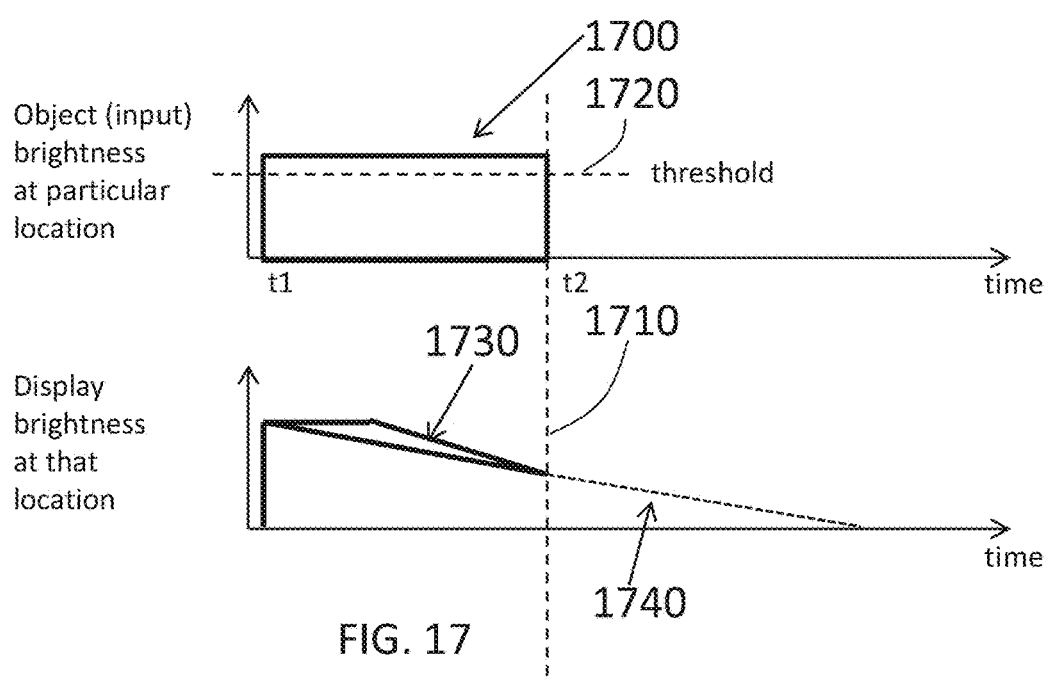
Figure 18A:
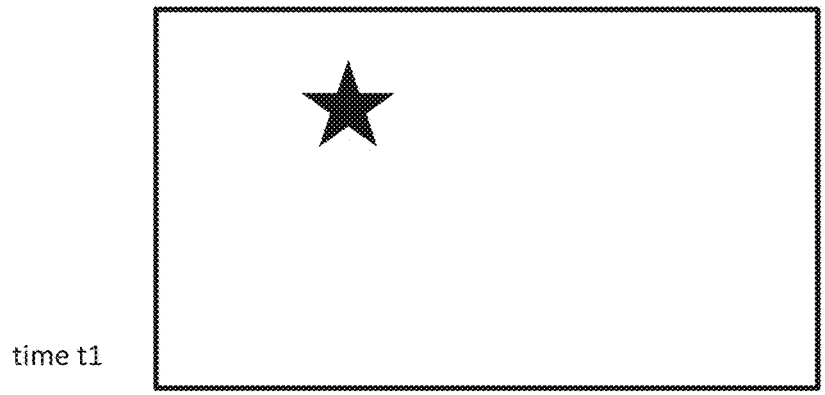
Figure 18B:
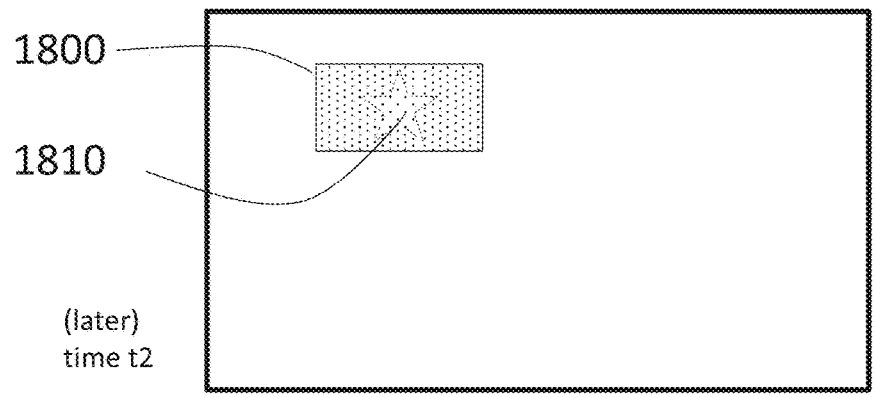
Figure 19:
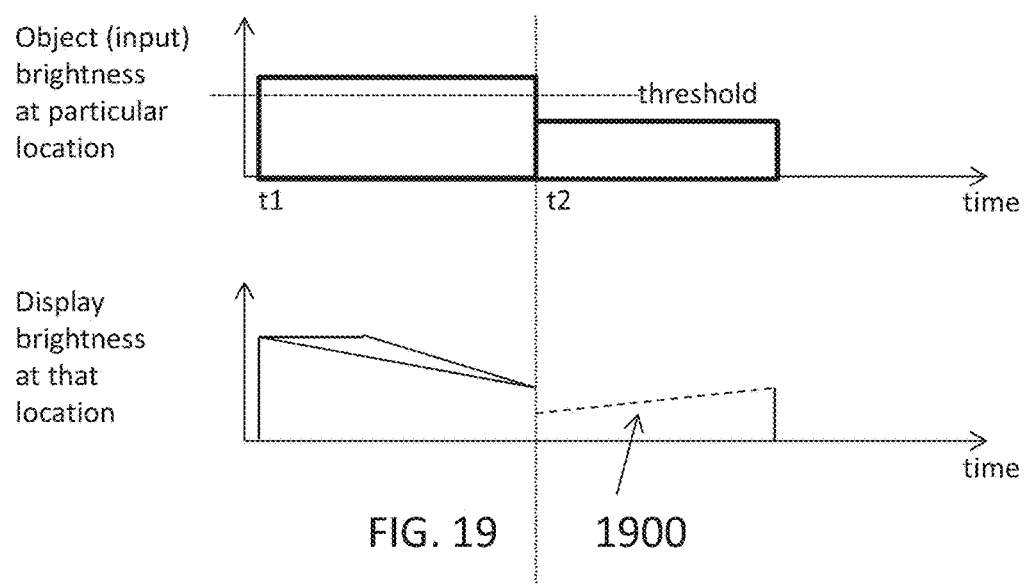
Figure 22:
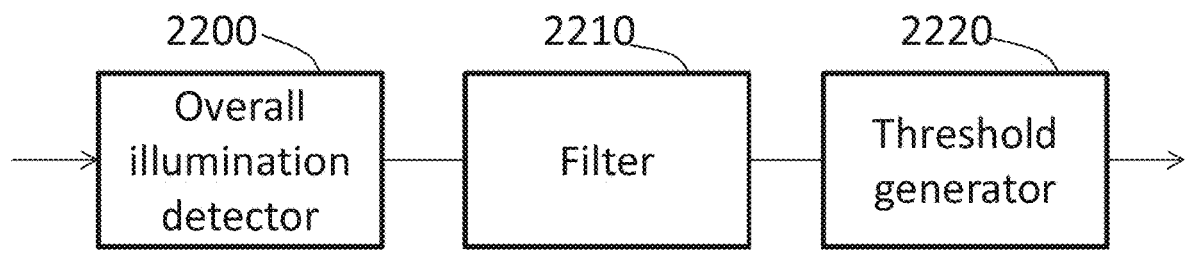
Figure 23:
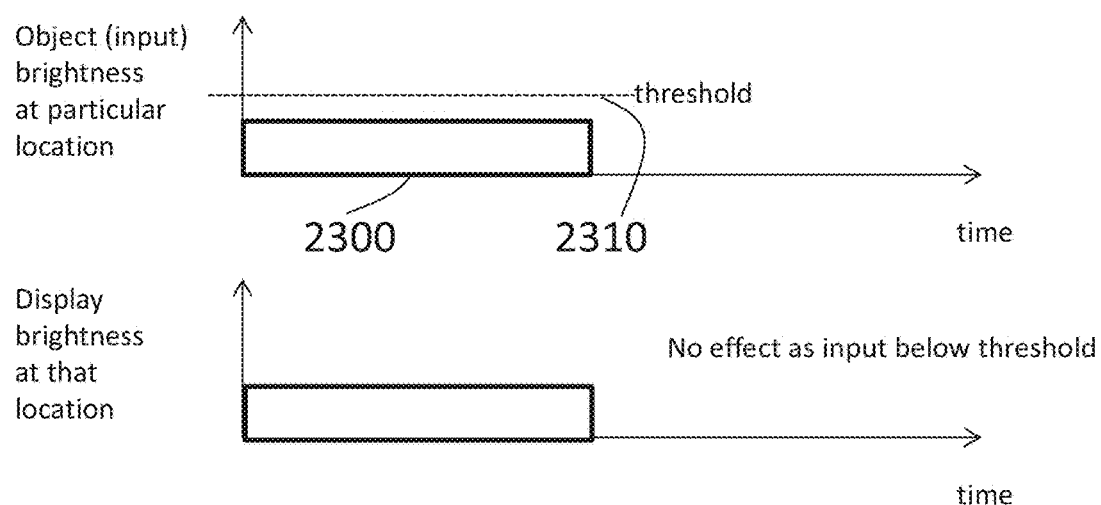

Embodiments of the disclosure will now be described, by way of example only, with reference to the accompanying drawings, in which:

FIG. 1 schematically illustrates an HMD worn by a user;

FIG. 2 is a schematic plan view of an HMD;

FIG. 3 schematically illustrates the formation of a virtual image by an HMD;

FIG. 4 schematically illustrates another type of display for use in an HMD;

FIG. 5 schematically illustrates a pair of stereoscopic images;

FIG. 6a schematically illustrates a plan view of an HMD;

FIG. 6b schematically illustrates a near-eye tracking arrangement;

FIG. 7 schematically illustrates a remote tracking arrangement;

FIG. 8 schematically illustrates a gaze tracking environment;

FIG. 9 schematically illustrates a gaze tracking system;

FIG. 10 schematically illustrates a human eye;

FIG. 11 schematically illustrates a graph of human visual acuity;

FIGS. 12 and 13 schematically illustrate the use of head tracking;

FIG. 14 schematically illustrates an example video processing system;

FIG. 15 schematically illustrates an example video processing system;

FIGS. 16a, 16b and 17 schematically illustrate the simulation of positive after images and saturation;

FIGS. 18a, 18b and 19 schematically illustrate the simulation of negative after images;

FIGS. 20a to 20d schematically apply example techniques to a system using head tracking or image motion;

FIGS. 21a to 21d schematically apply example techniques to a system using gaze tracking;

FIG. 22 schematically illustrates the variation of a threshold;

FIG. 23 schematically illustrates operation below a threshold brightness; and

Figure 24:
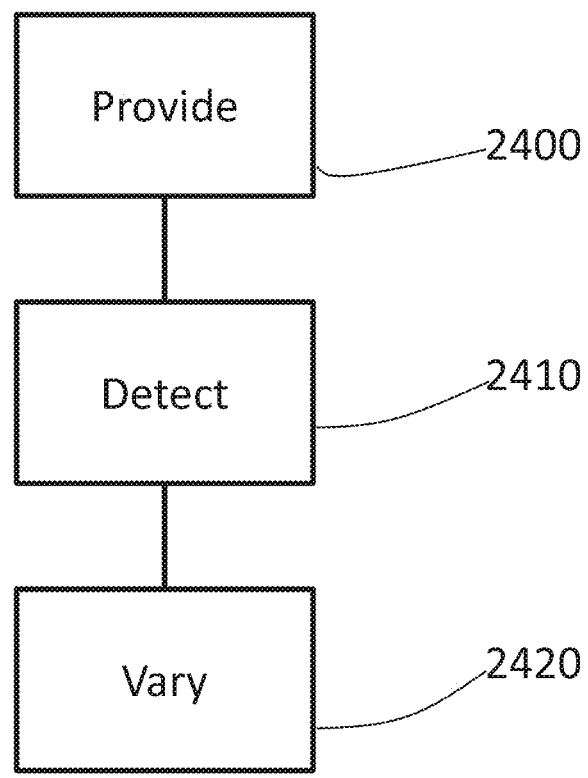

FIG. 24 is a schematic flowchart illustrating a method.

EXAMPLE EMBODIMENTS

Referring now to the drawings, wherein like reference numerals designate identical or corresponding parts throughout the several views, embodiments of the present disclosure are described. In FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example: (a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Turning to gaze tracking in such an arrangement, FIG. 6 schematically illustrates two possible arrangements for performing eye tracking on an HMD. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

FIG. 6a shows an example of a gaze tracking arrangement in which the cameras are arranged within an HMD so as to capture images of the user's eyes from a short distance. This may be referred to as near-eye tracking, or head-mounted tracking.

In this example, an HMD 600 (with a display element 601) is provided with cameras 610 that are each arranged so as to directly capture one or more images of a respective one of the user's eyes using an optical path that does not include the lens 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However it is considered that in a number of embodiments it is advantageous that the cameras are instead arranged so as to include the lens 620 in the optical path used to capture images of the eye. Examples of such positions are shown by the cameras 630. While this may result in processing being required to enable suitably accurate tracking to be performed, due to the deformation in the captured image due to the lens, this may be performed relatively simply due to the fixed relative positions of the corresponding cameras and lenses. An advantage of including the lens within the optical path may be that of simplifying the physical constraints upon the design of an HMD, for example.

FIG. 6b shows an example of a gaze tracking arrangement in which the cameras are instead arranged so as to indirectly capture images of the user's eyes. Such an arrangement may be particularly suited to use with IR or otherwise non-visible light sources, as will be apparent from the below description.

FIG. 6b includes a mirror 650 arranged between a display 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Of course, eye-tracking arrangements need not be implemented in a head-mounted or otherwise near-eye fashion as has been described above. For example, FIG. 7 schematically illustrates a system in which a camera is arranged to capture images of the user from a distance; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Whether an arrangement of the type shown in FIGS. 6a/6b or an arrangement of the type shown in FIG. 7 is used, a requirement is that the processing system (discussed below) can distinguish and/or evaluate a gaze direction from the captured images. This can be performed by analysis of captured images of the cornea and/or retina and/or by other techniques of the type discussed in:

https://en.wikipedia.org/wiki/Eye_tracking#Optical_tracking and/or
https://en.wikipedia.org/wiki/Video-oculography both of which are incorporated into this description by reference in their entirety.

As just one example, not to exclude other examples, the direction of gaze of an eye can be detected by detecting the location of the centre of the captured image of the pupil within the captured image of the cornea (whose outline is itself defined by a boundary with the sclera in the captured images). For example, a pupil centre which is central within a circular image of the cornea indicates a gaze straight ahead. Deviations of the captured pupil image in a particular direction from the central position indicate a gaze towards that direction.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in accordance with observed changes in brightness.

It is more common to use standard cameras in such tracking arrangements, given that they are widely available and often relatively cheap to produce. 'Standard cameras' here refer to cameras which capture images of the environment at predetermined intervals which can be combined to generate video content. For example, a typical camera of this type may capture thirty images (frames) each second, and these images may be output to a processing unit for feature detection or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

However, in some arrangements it may be considered advantageous to instead use an event camera, which may also be referred to as a dynamic vision sensor. Such cameras do not require a shutter as described above, and instead each element of the light-sensitive array (often referred to as a pixel) is configured to output a signal at any time a threshold brightness change is observed. This means that images are not output in the traditional sense—however an image reconstruction algorithm may be applied that is able to generate an image from the signals output by an event camera.

While there is an increased computational complexity for generating an image from such data, the output of the event camera can be used for tracking without any image generation. One example of how this is performed is that of using an IR-sensitive event camera; when imaged using IR light, the pupil of the human eye displays a much higher level of brightness than the surrounding features. By selecting an appropriate threshold brightness, the motion of the pupil would be expected to trigger events (and corresponding outputs) at the sensor.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

As suggested in the discussion above, the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive to high frequency spatial detail, but instead sensitive to time varying fluctuation of light intensity and colour.

As has been discussed above, foveal rendering is a rendering technique that takes advantage of the relatively small size (around 2.5 degrees) of the fovea and the sharp fall-off in acuity outside of that.

The eye undergoes a large amount of motion during viewing, and this motion may be categorised into one of a number of categories.

Saccades, and on a smaller scale micro-saccades, are identified as fast motions in which the eyes rapidly move between different points of focus (often in a jerky fashion). This may be considered as ballistic motion, in that once the movement has been initiated it cannot be altered. Saccades are often not conscious eye motions, and instead are performed reflexively to survey an environment. Saccades may last up to two hundred milliseconds, depending on the distance rotated by the eye, but may be as short as twenty milliseconds. The speed of a saccade is also dependent upon the total rotation angle; typical speeds may be between two hundred and five hundred degrees per second.

'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head.

Another type of motion is that of the vergence accommodation reflex. This is the motion that causes the eyes to rotate to converge at a point, and the corresponding adjustment of the lens within the eye to cause that point to come into focus.

Further eye motions that may be observed as a part of a gaze tracking process are those of blinks or winks, in which the eyelid covers the eyes of the user. Such motions may be reflexive or intentional, and can often interfere with eye tracking as they will obscure vision of the eye, and the eye is often not stationary during such a motion.

Head Tracking—Background

FIGS. 12 and 13 relate to the tracking of a head orientation in the context of virtual and/or augmented reality presentation to a user, for example using an HMD.

Referring to FIG. 12, a virtual environment for presentation to a user may be considered as a spherical (or at least part spherical or cylindrical) scene or environment 1200 surrounding the user's viewpoint 1210. In FIG. 12, a schematic downward-looking plan view is provided for clarity of the diagram such that only lateral or side-to-side changes in head orientation are shown, but similar principles to those described below could apply to up-and-down head movement.

At any particular instant, the available field of view for the user allows a region of the scene 1200 to be observed. In FIG. 12, the (initial) currently observed portion is defined by boundaries 1205. Generally speaking, the remainder of the scene is not rendered, or at least is not fully rendered, for display.

Assume that the user's viewpoint 1210 rotates in a direction indicated by an arrow 1220 such that the currently viewed portion of the scene 1200 changes from that defined by boundaries 1205 into a different portion defined by boundaries 1230. In practice this is detected by an orientation detector 1402 (FIG. 14) associated with the HMD. Orientation detection of an HMD is established and such detection can be made by various techniques such as any one or more of (i) integrating or otherwise processing the output of an accelerometer which moves with the HMD; (ii) detecting changes in images captured by a camera which moves with the HMD, using for example so-called optical flow techniques so that the detected changes are indicative of changes in orientation of the HMD; (iii) observing one or more marker features of the HMD using a camera external to the HMD. For the purposes of this discussion, whichever orientation detection technique is used, it is shown schematically by a detector 1402 associated with the HMD 1400.

Returning to FIG. 12, when the rotation 1220 has been detected by the detector 1402, a new image for display is rendered based around the boundaries 1230 with respect to the virtual scene 1200.

Consider now an image feature 1240 within the virtual scene 1200. Referring to FIG. 13, a representation 1300 is provided of an image displayed to the user wearing the HMD at the initial orientation corresponding to the boundaries 1205. Within the image, a representation 1310 of the image feature 1240 is provided towards the left side of the displayed image. Following the rotation to the new orientation represented by the boundaries 1230, a different image 1320 is displayed but this just represents a different view of the same underlying virtual environment 1200 so that the representation of the image feature 1240 has moved to a right-side position representing its location between the boundaries 1230.

Therefore, FIG. 14 shows a summary arrangement encompassing the techniques described above, in which the HMD 1400 is provided (or at least associated) with an orientation detector 1402 and a gaze direction detector 1404 (for example, one or more cameras as described above). The orientation detector 1402 and the gaze direction detector 1404 provide information, for example in the form of control signals, to a head tracker 1410 and a gaze tracker 1420. An image generator 1430 generates images for display by the HMD 1400. The generation of the display images is under the control of head tracking information provided by the head tracker 1410 and optionally under control of gaze tracking information provided by the gaze tracker 1420. Alternatively, or in addition, the gaze tracker 1420 may provide control signals to other processing, for example to control processing functions such as gameplay, menu selection or the like which may indirectly lead to changes in the images generated by the image generator 1430.

Summary Embodiment

Arrangements will be described below in which the generated images for display (or alternatively, the process of generating the images for display) can be affected by the image content itself and/or by gaze detection.

Referring to FIG. 15, there is shown an example of apparatus comprising: an image generator configured to provide output video images to a head mountable display, HMD 1400, having (as described earlier) one or more display elements to display video images to a wearer of the HMD, for display by the one or more display elements in response to input video images, in which each output video image corresponds to a respective input video image. Here, the image generator may be in the form of an image generator 1430 of the type discussed above, with the generated images being post-processed by an image processor 1510 to be described below, or may be represented by a composite image generator 1520 incorporating the functionality of the image generator 1430 and that of the post-processor 1510. The image generator comprises a detector, implemented by the image processor function 1510 configured to detect whether an input image brightness at image locations in the input video images exceeds a threshold image brightness. The image generator is configured to vary a relationship between the display properties such as display brightness at a given image location in a given output video image and the input display properties such as image brightness at the given image location in the corresponding input video image in response to a detection that image brightness at the given image location in one or more input video images preceding that corresponding input video image exceeded the threshold image brightness. This functionality will be discussed in more detail below, and may be based upon any one or more of the following: (i) intrinsic, for example time-varying, brightness properties of regions of the image for display generated by the image generator 1430; (ii) changes in the generated images caused by detected head tracking; (iii) changes in the user's view of the displayed images detected by gaze tracking.

These arrangements will be discussed in further detail below. As mentioned, they may be provided by a post-processing function 1510 or may be implemented as a part of the overall image generation process. At least a part of the aim of the techniques discussed below is to simulate certain physiological and/or psychovisual features of the human visual system. A reason why these features need to be simulated rather than occurring in reality is that at least some of them are triggered by the human eye observing particularly bright portions of a displayed scene. At the priority date of the present application, the types of displays available for use in an HMD generally either do not provide a sufficient dynamic range and in particular peak brightness in order to allow such features to be actually experienced (that is to say, in reality) by the viewer, or are impractical for use in an HMD. Regarding this latter point, the power consumption and heat generation by a high-brightness, high dynamic range display would tend to make such display technologies unsuitable for a head-worn, potentially battery powered HMD. It is also considered potentially safer to aim to implement a simulation of these physiological and/or psychovisual features using lower image brightnesses than those which would actually be required to trigger these features for real, rather than exposing a user to very bright illumination inside a headset such that the user cannot fully look away from the bright illumination. For these reasons, simulations are proposed using the techniques to be discussed below.

In the discussion of simulation techniques, the image processor function 1510 will be described as separate to the image generation function 1430 such that so-called "input images" having an "input image brightness" are provided by the image generator function 1430 to the image processor function 1510 and are processed to form "output images" having a "display brightness". This is simply for clarity of the discussion and once again it is mentioned that the two functions could be combined into a single function 1520 in which case the "input images" represent the form of the images which would be displayed if the image processing function 1510 were not also provided.

Simulation of Positive after Images and Saturation

FIGS. 16a, 16b and 17 referred to the simulation of so-called positive after images and saturation.

Referring to FIG. 16a, and image feature 1610 is displayed within a display image 1600 for a time period including at least a time instant t1. At a later time instant t2, the image feature 1610 is no longer displayed, at least not at the same image location as at the time t1. Note that this change (from displaying the image feature 1610 at a particular location to not displaying the image feature 1610 at that location) could arise because of the intrinsic time-varying nature of the images and/or because the images have changed as a result of implementing a detected head orientation change so that, with respect to the current viewpoint at the time t2, the image feature 1610 is simply not at the same image location for viewing by the user as it was at the time t1.

FIG. 17 presents a graphical representation of this situation. Here, a vertical axis represents display brightness at a particular location and a horizontal axis represents time with the time instants t1 and t2 being shown along the horizontal axis. A threshold brightness 1720 is also indicated. This could be a fixed threshold representing a system configuration parameter or could be a dynamically varying threshold using example techniques to be discussed below.

Assume that the graphs refer to the image location of the image feature 1610 and that from the time t1 to just before the time t2, the "input image brightness" of the image feature 1610 exceeds the threshold 1720, as shown by a curve 1700. In the absence of the image features 1610, the "input image brightness" at that location is below the threshold 1720.

The lower curve of FIG. 17 schematically illustrates aspects of the processing provided by the image processor function 1520. These may be considered as two related categories of functionality which may both be applied or which may be applied individually in the absence of the other.

Referring to the period from the time t1 to just before the time t2, the display brightness relating to the object 1610 decays. Two example decay curves are illustrated with these are many examples and many other types of curve could be used. In general terms, the decay is such that over the entire period for which the object 1610 is displayed with an input image brightness greater than the threshold 1720, the display brightness at the end of that period is lower than the display brightness at the beginning of that period and any changes are such that the display brightness does not increase (in other words, the changes are monotonically downwards). In one of the example curves 1730 an initial period maintains the display brightness at its original value and the decay occurs from there, whereas in another of the example curves the display brightness decays continuously from its initial value. The decay can be towards a lowest display brightness which is greater than a zero display brightness and which may be provided as a proportion of the initial display brightness such as 50%. The proportion can be adapted in dependence upon the current threshold 1720 in use.

This arrangement simulates the saturation of the human eye's photoreceptors which occurs when the eye looks at a bright object. The saturation leads to a decline in the sensitivity of the eye at that particular image location (assuming the eye continues to look at the same location). In a real situation, if a user stared at a bright light the like would be perceived by the user to decreasing brightness as the photoreceptors saturate. Note that the user may not even be aware that this change in perception is occurring, but in the context of a simulated image such as one for display by an HMD, the lack of such a change can detract from a sense of reality of the displayed images. So, even though the user may not explicitly notice the presence of factor receptor saturation in normal life, the user may subconsciously or unknowingly recognise its absence in the context of displayed images while wearing an HMD. For this reason, the applied decay function 1730 can increase the perception by the user of reality with respect to HMD-displayed images, even if the user does not necessarily understand why this change in perception is occurring.

Referring to the period from the time t2 onwards, the image feature 1610 is no longer displayed, at least not at the same location as in FIG. 16a. However, a positive after image represented by a decaying display brightness 1740 at that image location may be simulated so that for release a short period of time (for example 0.5 seconds) the display features 1610 is perceived to be remaining in the form of a rapidly decaying ghost image. Once again, this is something which the user would experience in real life if the user looked at a particularly bright object and then the object disappeared or moved away, even if the user is not explicitly aware of experiencing it. The images displayed by an HMD are typically (as discussed above) not bright enough to trigger the effect to a noticeable level as a a consciously perceptive local effect in reality, but the application of the decay curve 1741 is the display object 1610 is no longer displayed at higher than the threshold brightness at the location of FIG. 16a, can provide the simulation of such a feature and increase the user's sense of reality while using the HMD.

In some examples, the colour balance distribution is changed for the simulation of the positive after image by the decaying display brightness 1740, for example to de-emphasise blue light within the simulated positive after image so that the simulated positive after image appears to be a ghost image which is redder than the originally displayed image feature 1610.

As before, the effects can be applied after the time t2 in respect of image features which are no longer displayed and/or image features which have moved in their image location, either by virtue of natural changes within the displayed image or by virtue of head tracking adjustments.

Negative after Images and Saturation—Simulation

FIGS. 18a, 18b and 19 discuss examples of this arrangement.

The arrangements of FIGS. 18a and 18b are very similar to those shown in FIGS. 16a and 16b except that from the time t2 onwards, a lower brightness object 1800 continues to be displayed at the same location.

Referring to FIG. 19, the graphs use a similar notation to those of FIG. 17, and in this case the upper curve shows an initial period from t1 to just before t2 in which the display object 1610 is presented at an input brightness higher than the threshold, and a second period from t2 onwards in which the lower brightness object 1800 below the threshold brightness is presented. During the first of these periods, a decay may optionally be simulated using the same techniques as those described above.

However, taking into account the simulation of the saturation and therefore lower sensitivity of the photoreceptors, a negative after image is also simulated. This is represented by a curve 1900 which in turn represents that at those locations occupied by the initially displayed object 1610, the display brightness of the object 1800 is suppressed. This simulates the photoreceptors at those locations with respect to the forward gaze direction having a temporarily suppressed sensitivity. The result is a negative ghost image 1810 of the object 1610 (in fact, a region of suppressed photoreceptor sensitivity shaped the same as the object 1610) which disappears as the photoreceptors recover their normal sensitivity over a period such as 0.5 seconds. At the end of that period, the display brightness of the object 1800, even in regions which were previously occupied by the object 1610, has returned to a full display brightness and so the ghost image has disappeared.

Once again, in some examples, the colour balance distribution is changed for the simulation of the negative after image, for example to de-emphasise blue light within the simulated negative after image so that the simulated negative after image appears to be a ghost image which is redder than the originally displayed image feature 1610.

Example Relating to Image Motion

FIGS. 20a to 20d schematically illustrate example images 2000 in which an image object 2010, which exceeds the threshold input image brightness, is moving. For example, the movement is in a direction 2020. Note that this movement could be caused by a "normal" time-varying aspect of the image itself and/or in response to head orientation detection using the techniques discussed above.

Figure 20A:
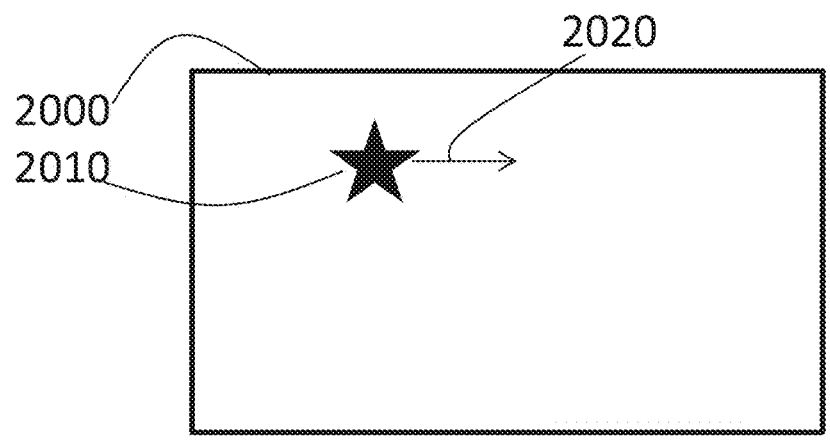
Figure 20B:
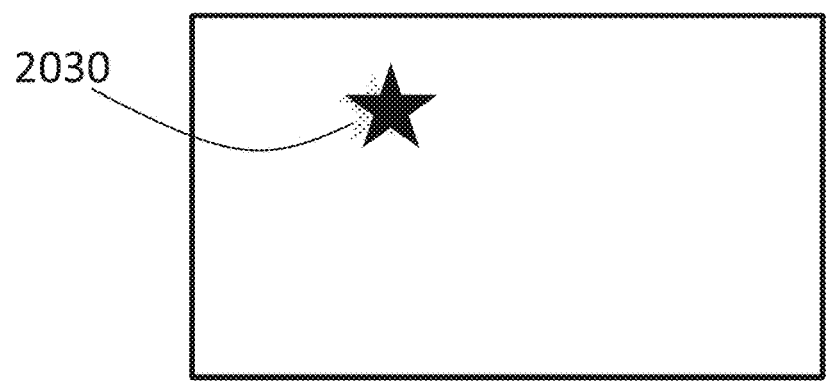
Figure 20C:
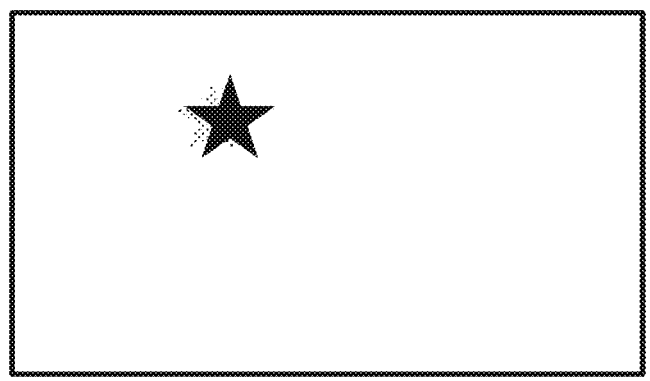
Figure 20D:
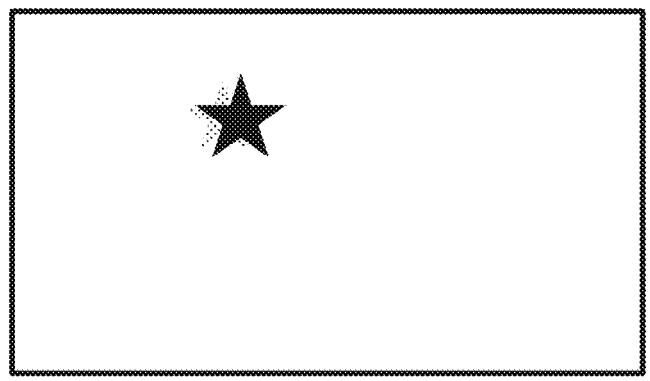
Figure 21A:
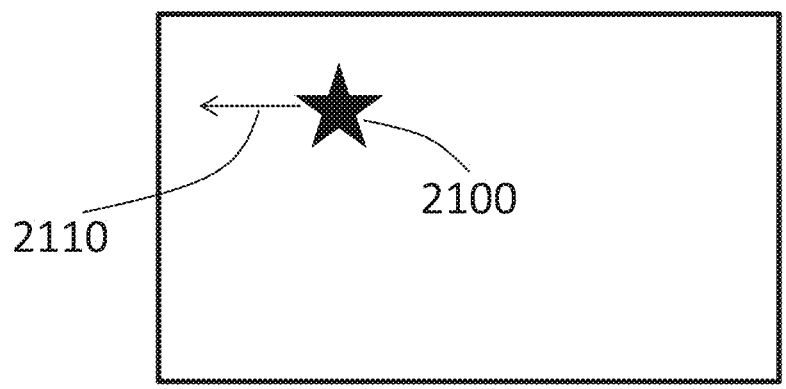
Figure 21B:
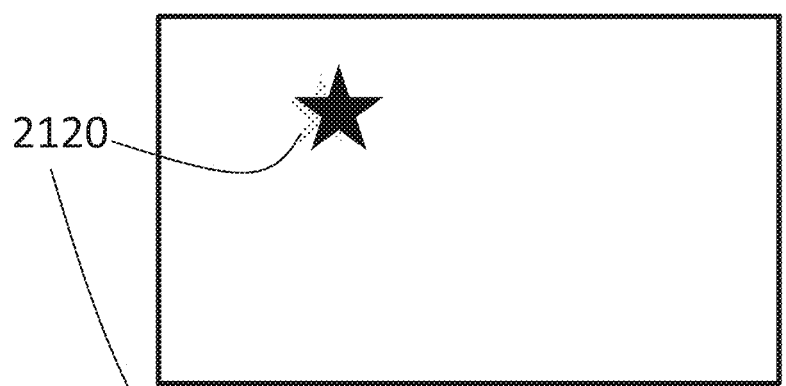
Figure 21C:
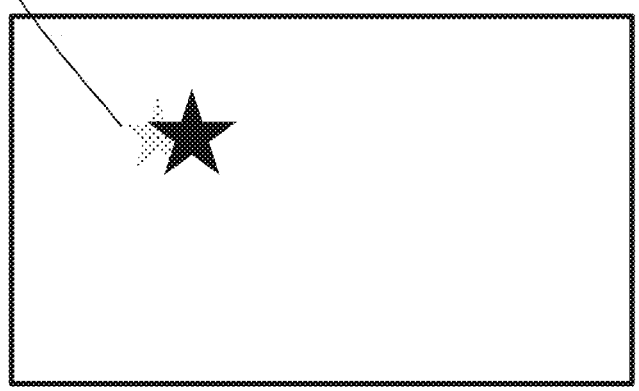
Figure 21D:
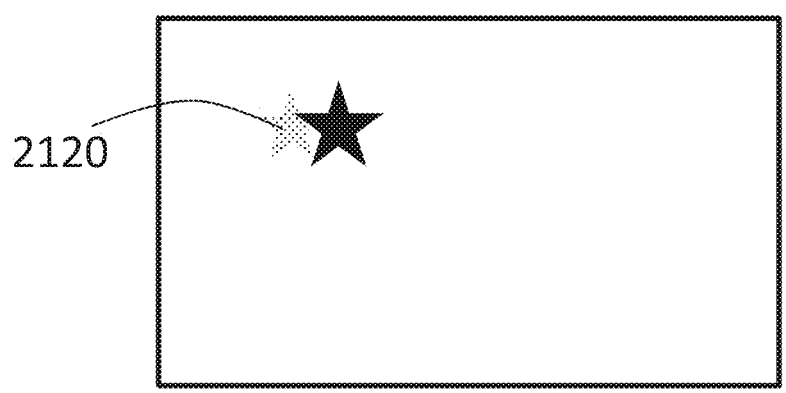

In FIGS. 20b to 20d, the positive after image and/or the negative after image (whichever or both are implemented in simulation) appear as a ghost image 2030 which appears to follow the moving object 2010. Because the after-images decay with time, the extent (in terms of image position) by which they followed the moving object 2010 will depend upon the speed of the movement and the decay period for the after image.

Example Relating to Gaze Tracking

FIGS. 21a to 21d provide a schematic example in which a stationary displayed object 2100 greater than the threshold brightness is shown, and the gaze direction detected for the user is such that the user is initially looking directly at the object 2100 but then moves his or her gaze to the left as shown by an arrow 2110. The period of looking directly at the object 2100 is sufficient to lead to the simulation of one or both of positive after images and negative after images, so that as the gaze is detected to move in the path shown by the arrow 2110, these after images 2120 move with the gaze direction so that they are always at the centre of the user's prevailing gaze direction.

Example Relating to Threshold Variation

In a real situation, which the present examples aim to simulate, the threshold image brightness at which after images are stimulated for the real eye can vary, for example through the photoreceptors becoming accustomed to a particular average illumination and/or by virtue of the eye's pupil changing size in response to overall or localised illumination.

In order to simulate these facets of the physiological or psychovisual system of human vision, the threshold 1720 can be varied in response to an overall (whole image or localised area around the gaze direction) illumination or brightness level in the input images.

Referring to FIG. 22, and overall illumination detected 2200 detects the overall illumination or brightness either of the whole image or a predetermined area around the current or prevailing gaze direction. This detected illumination is filtered by a low-pass filter 2210, having for example a five second time constant, and from the filtered output of the filter 2210 a current threshold is generated. In general terms, for a filtered output indicating a rising average illumination, the generated threshold will tend to increase and for a filtered output indicating a falling average illumination, the generated threshold will tend to decrease.

Example of Below-Threshold Display

Referring to FIG. 23, a period of display represented by a curve 2300 below the threshold 2310 will, under the present simulation arrangements, cause no effect either in terms of simulated saturation of photoreceptors or positive or negative after images.

Other Display Properties

The examples discussed above relate to image brightness as an example of a display property. Other display properties may be varied as well or instead, in particular intensity, hue, saturation, colour balance or the like, for example so as to simulate a generally blue-shifted or generally red-shifted after image. Multiple display properties may be varied for the same image or pixel position.

Summary Method

FIG. 24 is a schematic flowchart illustrating an example method comprising: providing (at a step 2400) output video images to a head mountable display, HMD, having one or more display elements to display video images to a wearer of the HMD, for display by the one or more display elements in response to input video images, in which each output video image corresponds to a respective input video image;

detecting (at a step 2410) whether an input image brightness at image locations in the input video images exceeds a threshold image brightness; and varying (at a step 2420) a relationship between the display properties at a given image location in a given output video image and the input image display properties at the given image location in the corresponding input video image in response to a detection that image brightness at the given image location in one or more input video images preceding that corresponding input video image exceeded the threshold image brightness.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

The invention claimed is:

1. Apparatus comprising:
an image processor configured to provide output video images to a head mountable display, HMD, having one or more display elements to display video images to a wearer of the HMD, for display by the one or more display elements in response to input video images, in which each output video image corresponds to a respective input video image;
in which:
the image processor comprises a detector configured to detect whether an input image brightness at image locations in the input video images exceeds a threshold image brightness; and
the image processor is configured to vary a relationship between display properties at a given image location in a given output video image and the input display properties at the given image location in the corresponding input video image in response to a detection that image brightness at the given image location in one or more input video images preceding that corresponding input video image exceeded the threshold image brightness.

2. The apparatus of claim 1, in which the given image location represents the same image location in the given output video image and in the one or more preceding input video images.

3. The apparatus of claim 1, comprising: a gaze detector associated with the HMD and configured to detect a gaze direction for each eye of the wearer of the HMD.

4. The apparatus of claim 3, in which the given image location for an image represents an image location pointed to by the gaze direction detected for that image.

5. The apparatus of claim 1, in which the image processor is configured to decrease a ratio between the display brightness at the given image location in the given output video image and the input image brightness at the given image location in the corresponding input video image with respect to time so as to simulate a decline with respect to time in the sensitivity of the vision of the wearer of the HMD.

6. The apparatus of claim 5, in which the image processor is configured to decrease the ratio towards a predetermined minimum ratio.

7. The apparatus of claim 1, in which the image processor is configured to display a representation of image content from the given output video image at the given image location as an after image, in one or more output video images after the given output video image.

8. The apparatus of claim 7, in which the image processor is configured to vary a colour balance of the representation with respect to the colour balance of the image content from the given output video image.

9. The apparatus of claim 1, in which the image processor is configured to decrease a ratio between the display brightness at the given image location in the given output video image and the input image brightness at the given image location in the corresponding input video image in one or more output video images after the given output video image.

10. The apparatus of claim 1, in which the image processor is configured to determine the threshold image brightness in response to the image brightness of at least a region of one or more of the input video images.

11. The apparatus of claim 10, in which the region comprises a whole image.

12. The apparatus of claim 10, comprising:
a gaze detector associated with the HMD and configured to detect a gaze direction for each eye of the wearer of the HMD,
in which the region comprises a part of an image around the detected gaze direction.

13. The apparatus of claim 1, the apparatus comprising an HMD.

14. The apparatus of claim 1, comprising a video game apparatus.

15. A method comprising:
providing output video images to a head mountable display, HMD, having one or more display elements to display video images to a wearer of the HMD, for display by the one or more display elements in response to input video images, in which each output video image corresponds to a respective input video image;
detecting whether an input image brightness at image locations in the input video images exceeds a threshold image brightness; and
varying a relationship between display properties at a given image location in a given output video image and the input image display properties at the given image location in the corresponding input video image in response to a detection that image brightness at the given image location in one or more input video images preceding that corresponding input video image exceeded the threshold image brightness.

16. A non-transitory, machine-readable storage medium which stores computer software which, when executed by a computer, causes the computer to perform a method comprising:

providing output video images to a head mountable display, HMD, having one or more display elements to display video images to a wearer of the HMD, for display by the one or more display elements in response to input video images, in which each output video image corresponds to a respective input video image;

detecting whether an input image brightness at image locations in the input video images exceeds a threshold image brightness; and varying a relationship between display properties at a given image location in a given output video image and the input image display properties at the given image location in the corresponding input video image in response to a detection that image brightness at the given image location in one or more input video images preceding that corresponding input video image exceeded the threshold image brightness.

* * * * *